(No Model.) 5 Sheets—Sheet 1.

N. B. CLARK & F. B. KING.
STEAM BOILER.

No. 386,526. Patented July 24, 1888.

WITNESSES.
F. L. Ourand
John R. Farnum

INVENTORS.
N. Beach Clark,
Frank B. King.
By W. H. Bartlett, Attorney.

(No Model.) 5 Sheets—Sheet 3.

N. B. CLARK & F. B. KING.
STEAM BOILER.

No. 386,526. Patented July 24, 1888.

WITNESSES

INVENTORS.

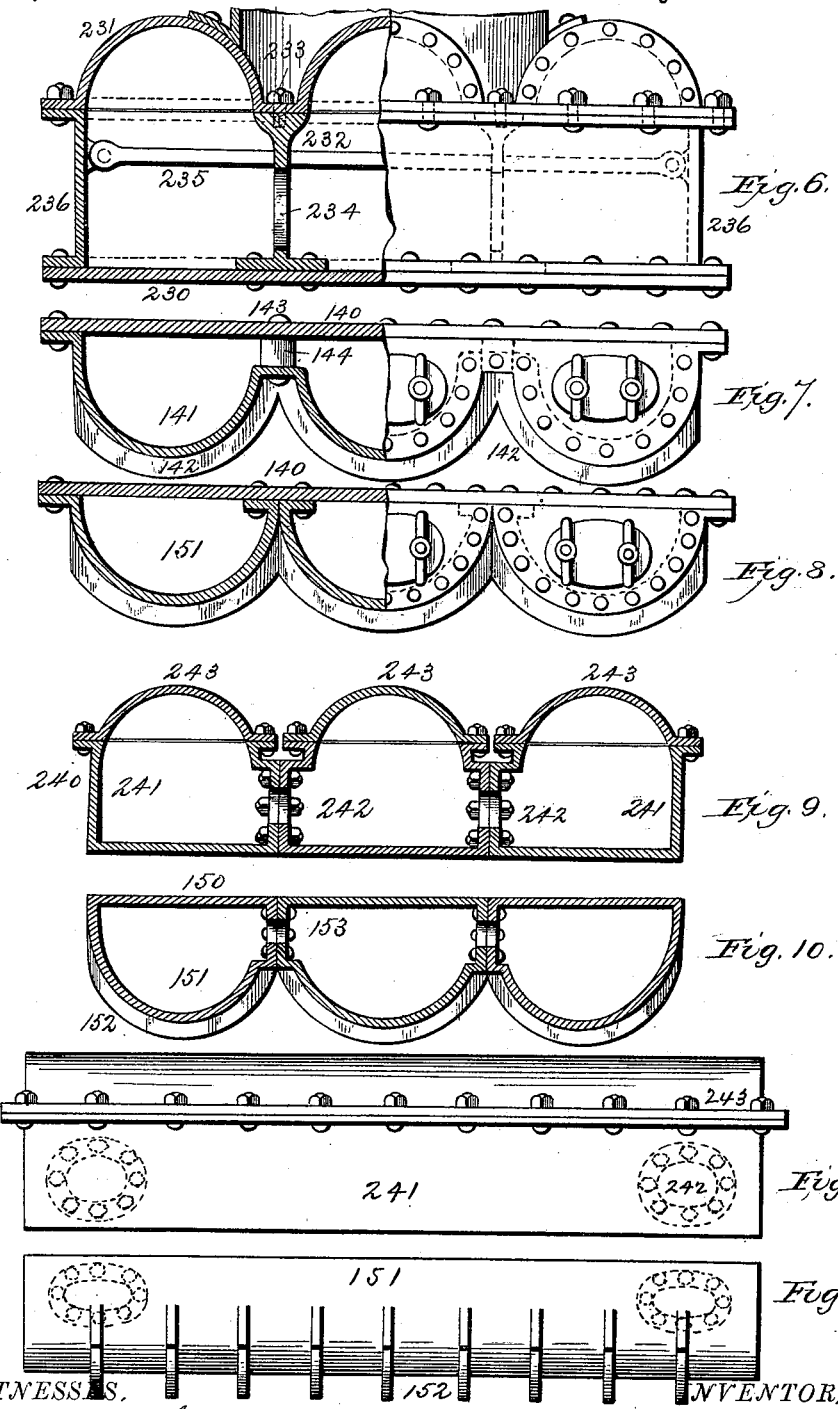

(No Model.) 5 Sheets—Sheet 5.

N. B. CLARK & F. B. KING.
STEAM BOILER.

No. 386,526. Patented July 24, 1888.

WITNESSES.
F. L. Ourand
John R. Farnum

INVENTORS.
N. Beach Clark
Frank B. King
By W. A. Bartlett
Attorney.

UNITED STATES PATENT OFFICE.

N. BEACH CLARK, OF WASHINGTON, DISTRICT OF COLUMBIA, AND FRANK B. KING, OF BALTIMORE, MARYLAND.

STEAM-BOILER.

SPECIFICATION forming part of Letters Patent No. 386,526, dated July 24, 1888.

Application filed March 21, 1888. Serial No. 267,991. (No model.)

*To all whom it may concern:*

Be it known that we, N. BEACH CLARK and FRANK B. KING, citizens of the United States, residing at Washington, in the District of Columbia, and in Baltimore, in the State of Maryland, have invented certain new and useful Improvements in Steam-Boilers, of which the following is a specification, reference being had therein to the accompanying drawings.

This invention relates to steam-boilers, especially to marine boilers of the water-tube variety.

The object of the invention is to provide a marine boiler in sections and to make the sections removable; also, to secure a complete combustion and as complete a utilization of the products of combustion as practicable; also, to permit easy access to all parts for repairs and renewals; also, to reduce the weight and increase the heating-surface.

The invention consists in certain constructions of the boiler-sections and tube-sheets whereby a light and compact boiler is made.

Figure 1:
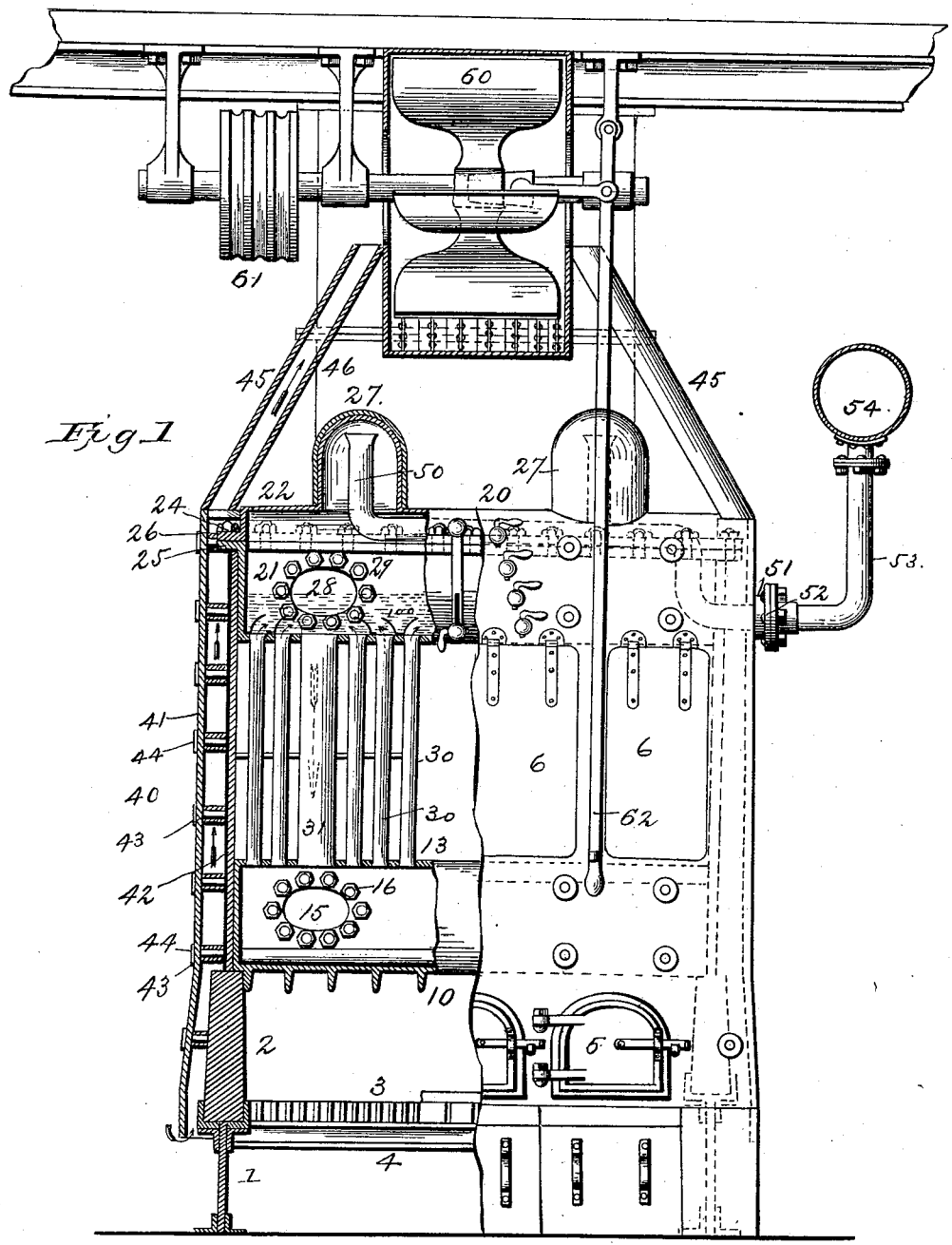
Figure 2:
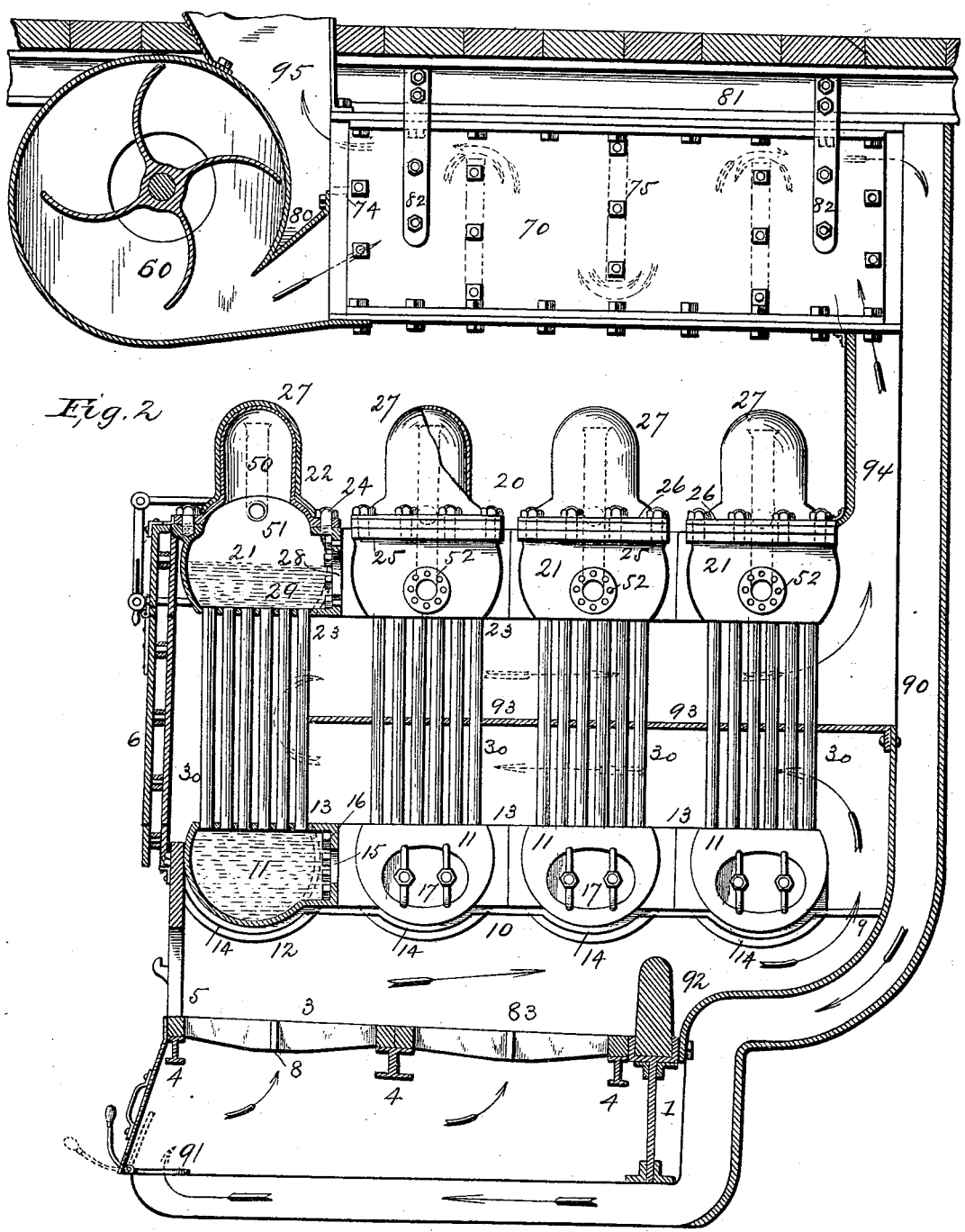
Figure 3:
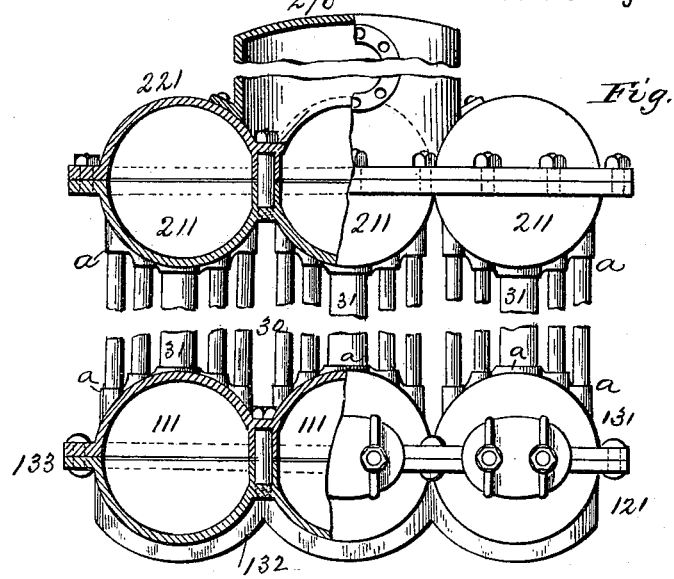
Figure 4:
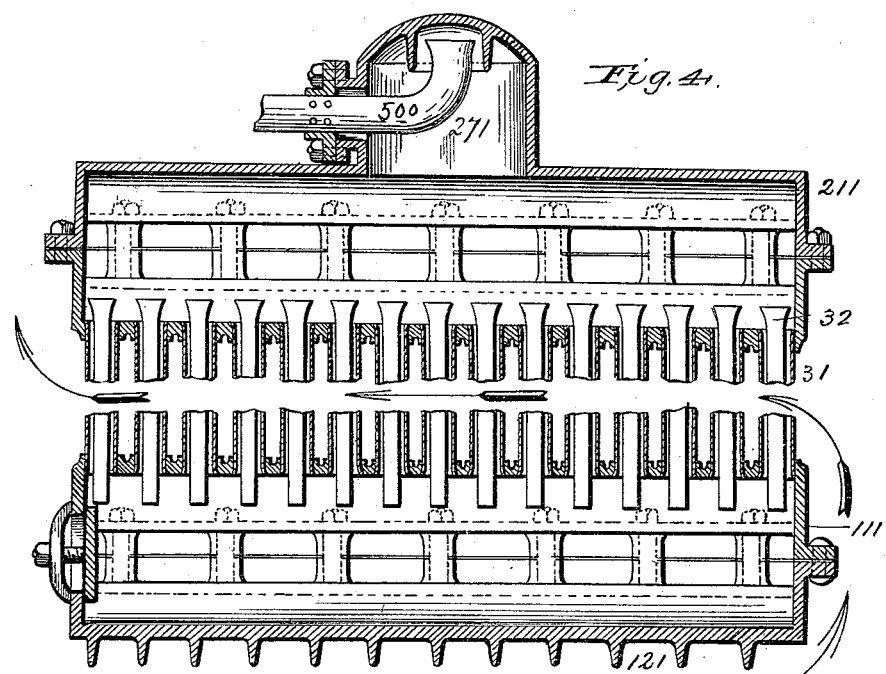
Figure 5:
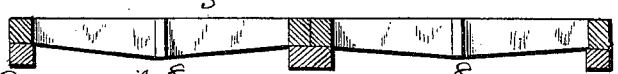
Figure 13:
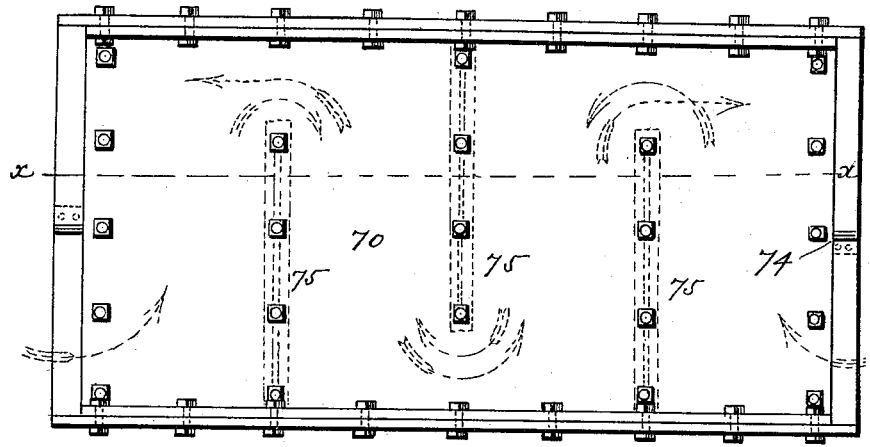
Figure 14:
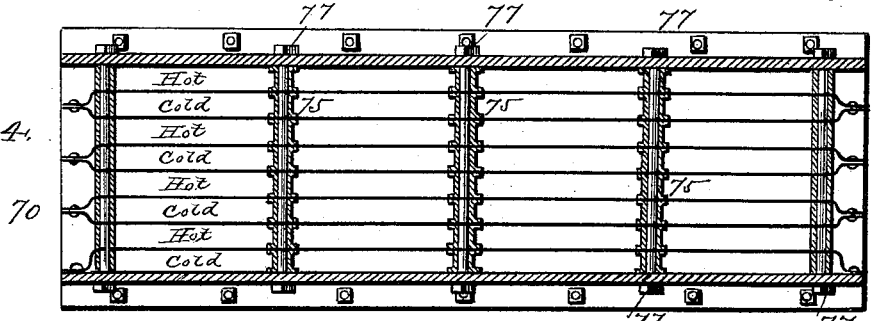
Figure 15:
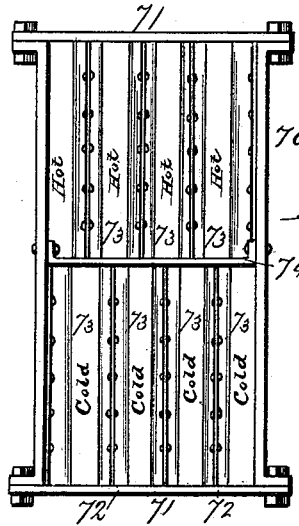
Figure 16:
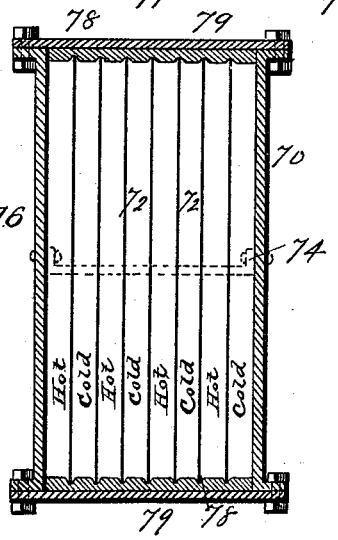

Figure 1 is a front elevation of one boiler of a battery, part of the front being broken away to show in section the interior of the furnace, the horizontal segments of the boiler and the vertical water-tubes, the casing, and the blower and interchanger. Fig. 2 is an end elevation with casing in section, showing the arrangement of the boiler units within the casing (one of these units being in section) and showing the connections from the interchanger to the furnace. Fig. 3 is a broken front elevation, partly sectioned, of one of the boiler-units slightly modified in construction. Fig. 4 is a vertical longitudinal section of the boiler-unit shown in Fig. 3. Fig. 5 is a side view of the grate-bar. Figs. 6 to 12 are views, hereinafter referred to, of certain members of the boiler-units slightly modified in some particulars. Fig. 13 is a side elevation of the heat-interchanger. Fig. 14 is a horizontal section of same on line *x x*. Fig. 15 is a front end view thereof. Fig. 16 is a vertical cross-section of the interchanger.

The numeral 1 indicates the ash-pit wall or support of the furnace. This supports a bridge-wall, 2, which in turn supports one end of the members of the boiler-unit. The grate-bars 3 are supported on beams 4, as usual.

The boiler-unit consists of a horizontal bottom member, 10, a horizontal top member, 20, and a series of connecting-tubes, 30 31, said tubes communicating at their lower ends with the bottom member, 10, and opening at top into the member 20. The bottom member may be supported on saddles 9, as numerous as may be required, or in other convenient manner.

The bottom member, 10, of the boiler-unit, as shown in Figs. 1 and 2, consists of a number of cast vessels, generally segmental in cross-section, which we designate "segments." These are preferably steel, each having a rounded bottom, 12, and flat or approximately flat top 13. The bottom of each segment may have ribs 14, which are cast with the segment. The proximate sides of these segments are flat and have connecting-openings 15, preferably near the ends of the segments, and the adjacent segments are held together by bolts 16. The outer segments of each boiler-unit are preferably rounded at their outer sides, and the passages 15 are omitted; but segments may be used of the same character as those in the middle and the outer passages closed. Each segment 11 has a man-hole with a cover, 17, of usual construction, which man-hole permits access to the segment.

The top member, 20, consists of a number of parallel segments, 21, having approximately flat lower surfaces, 23. The upper portion of each segment has a bonnet, 22, secured by stud-bolts and nuts 24, engaging flanges 25 on the segment and flanges 26 on the bonnet. The upper portion of the bonnet has steam-domes 27, preferably two in number, one near each end of the bonnet. The proximate surfaces of the segments 21 have openings 28, one near each end of the segment, and the segments are held together by bolts 29. Access is had to the upper segments 21 by removing the bonnets 22.

The upper members, 20, are connected to the lower members, 10, of the boiler-units by tubes 30 31. The tubes 30 are of small diameter—say about two inches in a boiler of average size. The tubes 31 are of considerably greater diameter than the tubes 30, but are less in number. All these tubes enter the plates of the top and bottom members of the boiler-units, and are preferably secured by expanding the ends; but other known modes of securing the tubes may be adopted. Deflecting-plates 100, Fig. 1, may be used to give direction to the currents in the boiler.

The united cross-sectional area of the tubes 31 may be about equal to that of tubes 30. As the surface of the tubes 31 is much less in proportion to its contents than the surface of tubes 30, the water contained in these small tubes will be heated much more rapidly than that in the larger tubes. This gives an upward tendency to the water in tubes 30, and the water will flow down through tubes 31 to compensate for this rise. The steam developed in tubes 30 will assist in the circulation.

The boiler-unit will be inclosed in a shell, 40, consisting of plates 41 and 42, having a space between them caused by the insertion of spacing-pieces 43. The two plates are held together by tie-bolts 44, and are covered with non-conducting sheathing, such as asbestos. The shell thus has an open passage between the plates 41 and 42. This passage is open at the bottom and leads upward through inclosing-walls 45 and 46 into the vicinity of a fan-blower or other air-forcer, 60. Air entering the bottom of this passage will become heated and rise to the blower, and then be carried into the interchanger.

Inside each steam-dome there is an inverted siphon-pipe, 50, leading down into the upper segment 21 of the boiler-unit. Pipe 51 leads from these pipes 50 and extends through the passage 52 at the end of the segment 21. The horizontal pipes 51 extend up through elbows 53 to a steam-drum, 54, which is of such size as to form a collecting-chamber from all the steam-domes of a boiler-unit, and steam is drawn from this drum to the engine. The pipes 50 are open at top, and as they take the steam from the very top of the steam-domes the liability of "priming" is very small. It is advisable to have two domes to each boiler-segment, because the rolling of the ship frequently carries the water to one end of the boiler, so that the base of the dome may be filled with water. The pipe 51 will continue to draw steam from the other dome when one dome of a segment is thus closed by water, so that it receives but little steam from the boiler.

Now, suppose the boiler to be filled with water about to the water-line. (Indicated in the drawings, Figs. 1 and 2, by dotted lines.) The fire built on grate-bars 3 will rapidly heat the water, both in the horizontal segments and vertical tubes. The tubes 30, being small, will rapidly heat the water contained therein, causing an upward flow in these tubes, and of course a corresponding downflow in tubes 31. Steam rapidly forms and accumulates in the segments 21 and domes 27, from which it passes to drum 54 as the steam is drawn from said drum to supply the engine.

Access is had to the furnace by doors 5 and to the vertical tubes for brushing or cleaning the same by doors 6, which latter are double, like the rest of the inclosing-shell. (See Fig. 2.)

The steam-domes 27 may be jacketed in any usual manner, as in Fig. 1.

In the modification shown in Figs. 3 and 4, the proximate sides of the horizontal segments 111 and 211 are rounded instead of flat, and are supplied with nipples $a$ $a$, into which the tubes 30 and 31 are expanded or otherwise secured. The tubes 31 have internal tubes, 32, passing through them and extending a little way into the segments 111 and 211. These tubes 32 are supported by spider-flanges or in other suitable manner. The tubes 32, being protected from contact with the fire, will be comparatively cool, and will afford passages for the downflow of water, the upward flow then taking place in the annular space between tubes 31 and 32. The bottom sections, 121, of the segments 111 are cast as a unit, and are bolted to the top sections, 131, by tie-bolts 132, passing through the upper and lower plates constituting the shell of the segment, and by rivets or bolts 133, passing through flanges at the edges of the plates.

The steam-dome 270, as shown in Fig. 3, is bolted to the top plate, 221, which constitutes the cover of the top member, 211, of the boiler-unit. In Fig. 4 the steam-dome 271 is shown integral with the bonnet-section 221. In either case provision is made to take steam from the dome, as through pipe 500.

Access is had to the upper members of the boiler by moving the bonnet 221. The tubes can then be cleaned internally, or replaced when necessary, and expanded to fit the nipples in usual manner. Access to the lower member of the unit is had through man-holes, as usual.

Fig. 7 shows another form of the upper member of the boiler-unit. In this case the plates composing the segment are of rolled sheet-steel. The plates 230 constitute the tube-sheet. The bonnet 231 is a series of arches. Partition-plates 232 are held in place by bolts or rivets 233, and are provided with passages 234. A tie-rod, 235, supports the side plates, 236, against outward pressure. Except the bonnet and dome, this entire member is made of flat plates, or flat plates with bent flanges, all being riveted or bolted together.

Fig. 8 shows a lower member corresponding generally with the upper member last described. The tube-plate 140 is flat and extends across the unit. The inverted arches are united, as shown at 141, and may have ribs 142 rolled thereon. The arched plates are united to the tube-plates by bolts 143, passing through spacing-blocks 144.

The member shown in Fig. 8 differs from Fig. 7 only in that the arches 151 are rolled or struck up separately and are riveted alongside of each other to the tube-sheet 140.

The upper boiler member, 240, (shown in section, Fig. 9, and in elevation, Fig. 11,) consists of cast-metal sections bolted together side by side. The outer sections, 241, have openings 242 at their inner sides only, while the central section has corresponding openings at each side. Each part has a bonnet, 243, which can be removed without disturbing the other bonnets.

The lower member of the boiler-unit (shown in Figs. 10 and 12) corresponds generally with that last described. The segments 151 are each complete castings. The flat tube-sheets 150 are for the tubular connections to the upper member. The ribs 152 cast on the sections give an increased metallic surface exposed to the direct action of the fire and serve to strengthen the sections. Each segment 151 with its corresponding upper member, 241, and the connecting-tubes (such as 30 and 31) make a part of a boiler which may be detached and replaced.

The air-forcer 60 draws its main air-supply from any suitable source, either inside or outside the boiler-room, and incidentally receives the hot air which passes through the shell of the boiler. The forcer or blower propels the air through a heating apparatus, which we have termed an "interchanger." From this interchanger the air is forced down passage 90 at the rear of the boiler and furnace and enters the furnace from below the grate-bars. Passing through the burning coal or other fuel on the grate, the air becomes highly heated and mingled with the products of combustion. Following the course indicated by the arrows, Fig. 1, the products of combustion pass along the bottom of the lower member of the boiler, being deflected upward by bridge-wall 92. The heated air and gases are deflected forward between the tubes 30 and 31 by a horizontal plate, 93. At the front of the boiler the flames and gases are again turned back, so as to pass between the upper ends of the tubes 30 31 and close to the bottom of the top member of the boiler-unit. Thence the gases turn up through passage 94 and enter the interchanger. The smoke and spent gases of combustion pass out of the pipe 95. The interchanger 70 is composed of inclosing-plates 71, bolted together at the corners to form a rectangular box. This box is divided longitudinally by a large number of thin metallic plates, 72, so as to produce a large number of parallel passages. The plates 72 extend from top to bottom of the casing. At the front and rear of the casing the plates are cut for a little way to receive the dividing-bar 74. Above this bar the edges of the sheets are drawn together and riveted, closing alternate passages 73. Below the bar 74 the dividing-plates 72 are bent in the opposite direction and the edges fastened together, thus closing the passages 73 which are open above said bar 74 and opening those which are closed above said bar.

The rear construction of the interchanger is similar to that in front.

A number of vertical spacing-partitions, 75, extend alternately from the top and bottom of the interchanger into the passage 73. These partitions serves as deflectors and are held by bolts 77, passing through the interchanger.

The shield 80 directs air from the blower 60 into the passages 73 which open toward the blower below bar 74, these being alternate passages through the interchanger. The air entering these passages rises to the upper part of the interchanger, and is deflected alternately down and up in these narrow passages until it finally enters passage 90. (See arrows, Figs. 2 and 12.) At the same time the air and gases of combustion from the furnace enter the lower part of the alternate passages 73 from passage 94, and are deflected up and down in these passages in moving toward the pipe 95. It thus happens that the air in thin films passing through the interchanger from the blower moves in contact with heated plates, the plates all the time becoming more highly heated as the air moves toward the furnace. The gases from the furnace are all the time moving toward the air-forcer, where the air is coolest. Consequently this movement of the air-currents in thin films in opposite directions with only thin plates interposed tends to heat the incoming air to the highest degree and to rob the outflowing air and gases of all or nearly all the heat contained therein after leaving the boiler.

The interchanger may be supported beneath the deck-beam 81 by angle-irons 82, or in other suitable manner. Plates 79, of asbestus or similar material, receive the edges of plates 72, which are pressed into the asbestus and provide for a limited expansion and contraction of the plates. The plates 72 are as thin as possible, and the passages 73 are very narrow to prevent the passage of any large body of air or gas without causing close contact with the plates to effect the interchange of heat with the cold air.

The grate-bars 3 are shown in Figs. 2 and 5. The bars are supplied with central flanges, 8, and are supported at the ends on beams 4.

The preferred form of steam-segments 11 and 21 is to have their proximate faces nearly flat, while the opposite sides (top of 21 and bottom of 11) are arched. The flat surfaces or plates 13 and 23 are cut away for the passage of numerous tubes, and of course the internal pressure on these plates is correspondingly lessened. The plates are also sustained by the tubes 30 and 31, so that the pressure against them becomes in part a longitudinal pressure on said tubes. A very strong construction is thus effected, affording great facility for assembling the parts or for replacing worn-out parts.

The blowers or air-forcers 60 are driven by pulleys 61, or in other usual manner, and may be thrown into or out of operation by lever 62, or in other well-known ways.

As many boiler units or sections may be placed in battery as desirable. The casing may inclose one or more boiler-units. The units, as has been stated, are generally in parts or sections which can be assembled.

The feature of the removable bonnets on the top segments of the boiler is very important, as it permits easy access to the tubes for cleaning.

The interchanger, effecting an almost perfect utilization of the heat, is a feature of prime importance.

It is apparent that a skilled mechanic will suggest many modifications of parts without departing from the spirit of our invention. As an instance, the parts of segments can be made of sheet metal, pressed into shape between approximate forms, and have their flanges thickened by binding them with heavier metal.

While the light weight of our boiler adapts it especially for use on floating structures, its cheapness of construction and economy of action commend it for general use, including application to land and locomotive engines. The interchanger can also be used for economizing fuel in other furnaces than those of steam-boilers. The lower plate of the interchanger should be made so it can be easily removed by unscrewing the bolts holding it in place, so the ashes and soot collected in the bottom will drop out. The space between the interchanger and top member of the boiler permits the removal of either the bonnets of the boiler or the bottom plate of the interchanger. The spacing-plates will hold the partitions when the bottom plate of the interchanger is removed.

We do not herein claim the air heater and interchanger, as that is made the subject of a separate application, filed May 10, 1888, Serial No. 273,449.

What we claim is—

1. A steam-boiler consisting of a series of segments of the character described placed side by side and secured together, abutting and having direct communication with each other, forming the lower member of a unit, a series of segments similarly placed and connected forming the upper member, and connecting-tubes between said members.

2. In a steam-boiler, the combination of a flat plate forming the tube-plate of a boiler member and a series of arched sections attached to said plate, forming therewith a series of segments arranged side by side and connected together, substantially as described.

3. The combination, in a steam-boiler, of a bottom member and a top member connected thereto by tubes, a bonnet on the top member, said bonnet provided with a steam-dome, and a steam-pipe leading from the dome through the top member to the outside of the boiler, as set forth.

4. In a steam-boiler, the combination, with a steam section having a number of steam-domes, of separate pipes leading down from the top of the domes inside the steam-section to the outside of said section and thence to a drum common to all the domes, as set forth.

In testimony whereof we have affixed our signatures in presence of two witnesses.

N. BEACH CLARK.
FRANK B. KING.

Witnesses:
MARY TRIES,
JOHN R. FARNUM.